United States Patent [19]
McGushion

[11] Patent Number: 5,655,699
[45] Date of Patent: Aug. 12, 1997

[54] WORKHOLDER FOR PRECISION ORBITAL WELDING

[76] Inventor: Kevin McGushion, 1448 19th St., Santa Monica, Calif. 90404

[21] Appl. No.: 608,081

[22] Filed: Feb. 28, 1996

[51] Int. Cl.⁶ .................................................. B23K 37/053
[52] U.S. Cl. .................... 228/44.5; 228/29; 219/60 A
[58] Field of Search .................... 228/212, 29, 44.5, 228/49.3; 219/60 A, 61, 125.1, 161; 269/270, 287

[56] References Cited

U.S. PATENT DOCUMENTS

| | | | |
|---|---|---|---|
| 3,668,359 | 6/1972 | Emmerson | 219/60 A |
| 4,868,367 | 9/1989 | Benway et al. | 228/29 |
| 5,196,664 | 3/1993 | McGushion | 219/60 A |

*Primary Examiner*—Samuel M. Heinrich
*Attorney, Agent, or Firm*—Donald D. Mon

[57] ABSTRACT

A workholder to hold a workpiece, especially an end fitting, in accurate axial and angular orientation for orbital welding. It can optionally provide protection for sensitive surfaces on a fitting during the welding and handling processes.

6 Claims, 2 Drawing Sheets

WORKHOLDER FOR PRECISION ORBITAL WELDING

FIELD OF THE INVENTION

A workholder to hold a workpiece, especially an end fitting, in accurate axial and angular orientation for orbital welding. It can optionally provide protection for sensitive surfaces on a fitting during the welding and handling processes.

BACKGROUND OF THE INVENTION

Gases used in chip manufacture are highly toxic, and are required to be supplied to extremely high standards of purity. If particulates are deposited on the chip, expensive scrappage can result. There are numerous sources of particulates, some rather obvious such as leakage through a filter, and some not so obvious, such as particulates removed by the flowing gases from defective welds.

Discontinuities in the piping system can cause especial risk, because they can act as places for particulates to gather. Then when some physical event occurs which jars the system, perhaps no more than the slamming of a door, they can be released as a cloud and spoil large amounts of work-in-progress, much of which may have been well advanced.

As a consequence, very close tolerances must be observed when welding tubing lengths together, and in welding fittings to lengths of tubing. The abutting parts must be very accurately aligned, both axially and angularly, and when the weld is finished, it should neither project into the passage, nor recede from it.

Orbital welders are used for making these welds. A well-know welder to which this invention is especially adaptable is shown in U.S. Pat. No. 5,196,664 issued to Kevin McGushion on Mar. 23, 1993. Its disclosure is incorporated herein in its entirety for its showing of an orbital welder useful with this invention.

This invention is especially directed to the welding of a fitting to a tubing. Both the fitting and the tubing must accurately be held in place. Also, many fittings of the VCR type have extremely sensitive sealing faces. These metal faces are very smooth and clean, and are intended to be brought against a matching surface with the same properties to make a seal. It is essential that these surface not be touched, because any corrosion, roughness, or scratching would spoil a surface-to-surface abutment which is used to seal against leakage of very toxic gases.

Also, such fittings are intended to be completed by a nut which is captive on the completed welded assembly. It is necessary that the part of the fitting which is welded to a tubing not only be accurately aligned with that tubing, but that its bearing surface against which the nut is drawn must be properly aligned with the bearing surface on the nut.

It is an object of this invention to provide a workholder which will accomplish the above objectives in a device that is convenient to use.

BRIEF DESCRIPTION OF THE INVENTION

This invention comprises a workholder for the type of orbital welder shown in the said McGushion patent. The work-holder shown in said patent includes a frame having a base and two spaced apart wall members rising from the base. A clamp member is pivotally mounted to the upper end of each of the wall members. The lower face of each clamp member, and the upper face of each wall member, each has a recess, said recesses being aligned when the clamp member is closed. Latch means is provided on each clamp member releasably to hold its clamp member in its closed position. When the members are in the closed position, the recesses of each respective clamp member and wall member face toward each other.

According to this invention an axial one-half of a positioning sleeve is attached to a clamp member and a respective wall member, whereby when the clamp members are in the closed position, the two halves of the positioning sleeve together form a channel having a central axis.

Further according to this invention, a mount for holding the workpiece has a central axis and a peripheral cylindrical outer wall which is so proportioned and arranged as to be tightly held by the halves of the positioning sleeve, with its central axis coincident with the central axis of the assembled sleeve. The mount is thereby held in an accurate predetermined alignment relative to the frame that comprises the base and the wall members.

Both male and female fittings are expected to be used to join two tubing lengths, and each kind of fitting must be welded to an adjoining length of tubing. While a mount suitable only for holding a male fitting, or only for holding a female fitting may be provided, it is more economical to include provisions for both types on the same mount, and that is the preferred arrangement. However, mounts with provisions for only one type are also within the scope of this invention.

A fitting of the type for which this mount is specifically designed has a central axis, a tubular length, a head integral with the tubular length, an axial passage through tubular length and the head, a peripheral seal in said head extending around the passage, and a retention collar around the head. The retention collar includes a pair of flat disc-like faces normal to the central axis, facing on opposite sides of the collar. A tapered portion interconnects the head and the disc-like face at the smallest diameter of each of said disc-like faces.

A receiver is provided at an end of said mount. It includes an axial recess terminated by an end wall so disposed and arranged as to be contacted by one of the flat disc-like faces of the fitting, and having a depth sufficient to receive that portion of the head which bears the seal, without contact by the seal with any structure.

The receiver for a female nut is formed on a threaded neck to which a female nut is to be threaded, said nut including a bearing face adapted to contact the other one of the flat disc-like faces.

The receiver for the male nut is formed in a bore in an end of the holder. An internal thread in the bore receives the male nut, which includes a bearing face adapted to contact the other one of the flat disc-like faces.

According to this invention one of the contacting surfaces will contact one of the tapered portions to center said fitting on the central axis, while the other contacting surface abuts the other of said flat disc-like faces to clamp the fitting firmly in a centered and rotationally accurate position.

According to a preferred but optional feature of this invention, the sleeve halves are mounted to the wall of the holder and of the clamp so as to be laterally adjustable in order properly to center the central axis of the assembled sleeve halves.

The above and other features of this invention will be fully understood from the following detailed description and the accompanying drawings in which:

DETAILED DESCRIPTION OF THE INVENTION

Figure 1:
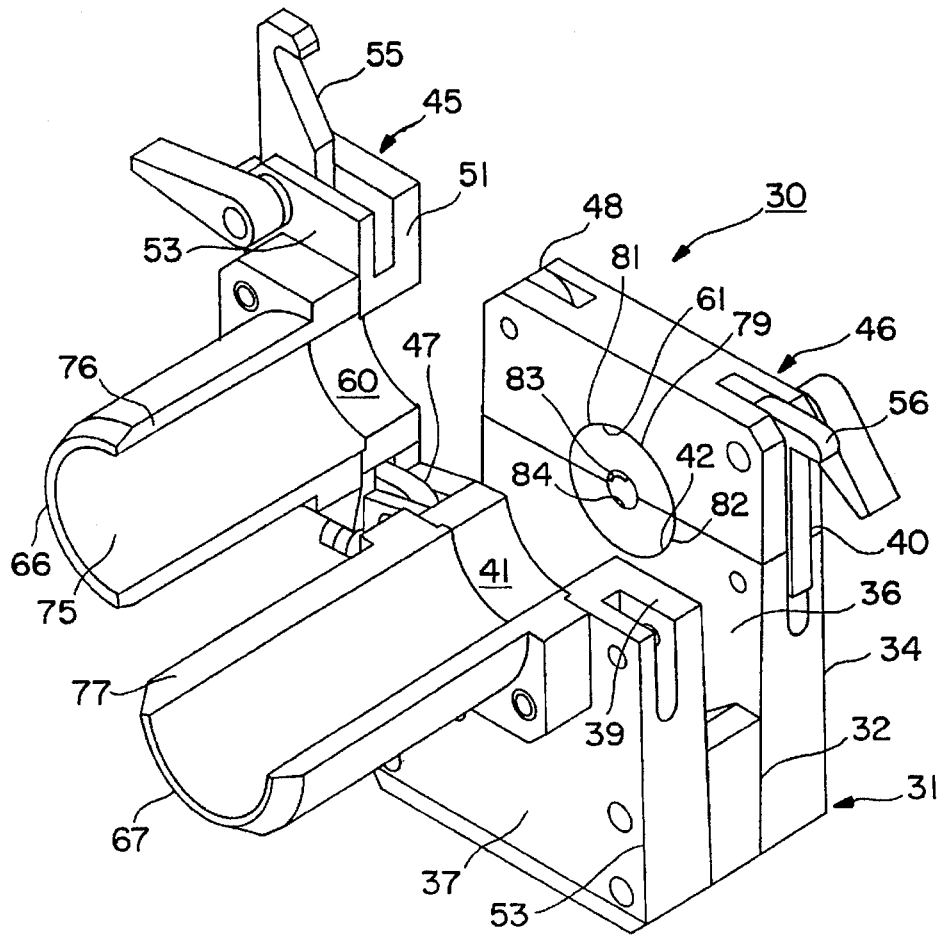
FIG. 1 is a perspective view showing the workholder of this invention partly in its open condition.
Figure 2:
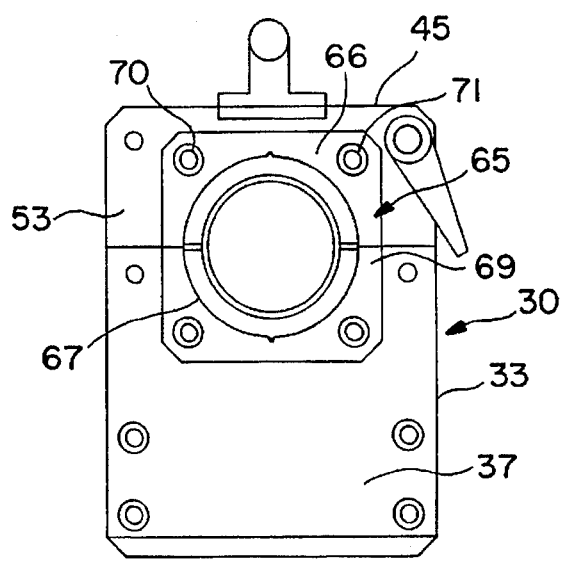
FIG. 2 is a side view of the workholder of FIG. 1 in its closed position.
Figure 3:
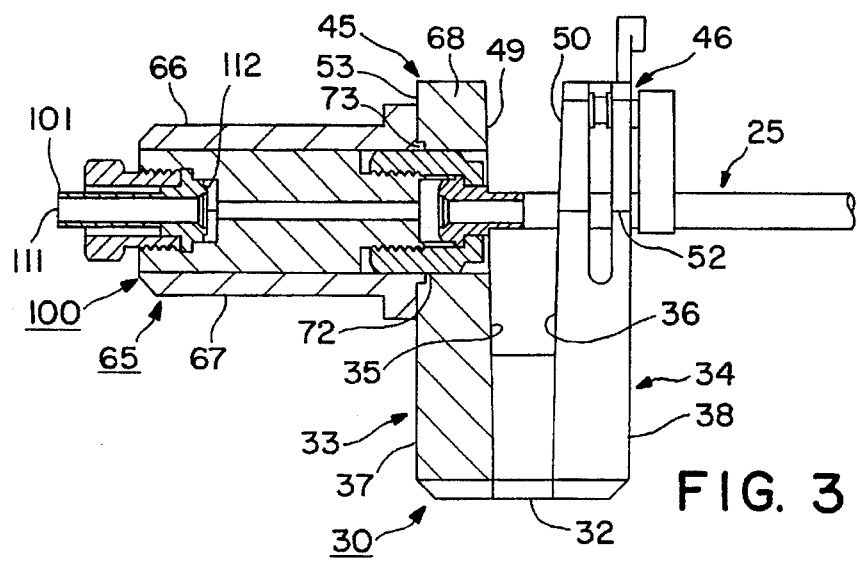
FIG. 3 is an end view of the workholder of FIG. 1, partly in cutaway cross section in its closed and loaded condition.
Figures 4, 5, 6:
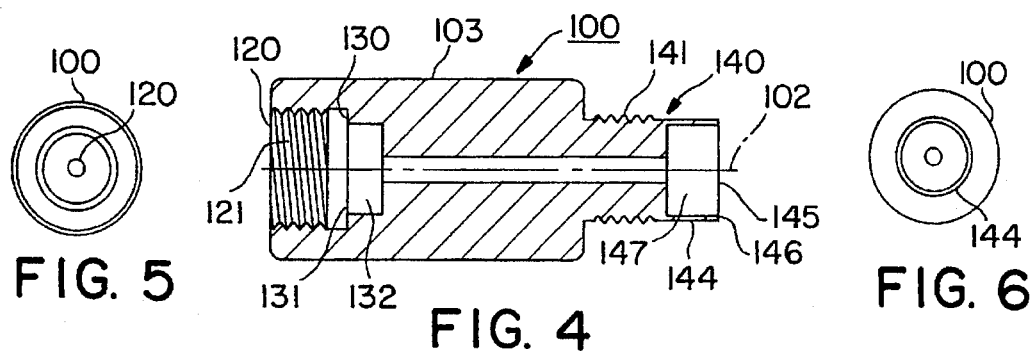
FIG. 4 is an axial cross-section of a mount shown in FIG. 3.
FIG. 5 is a left hand end view of FIG. 4.
FIG. 6 is a right hand end view of FIG. 4.
Figures 7, 8, 9:
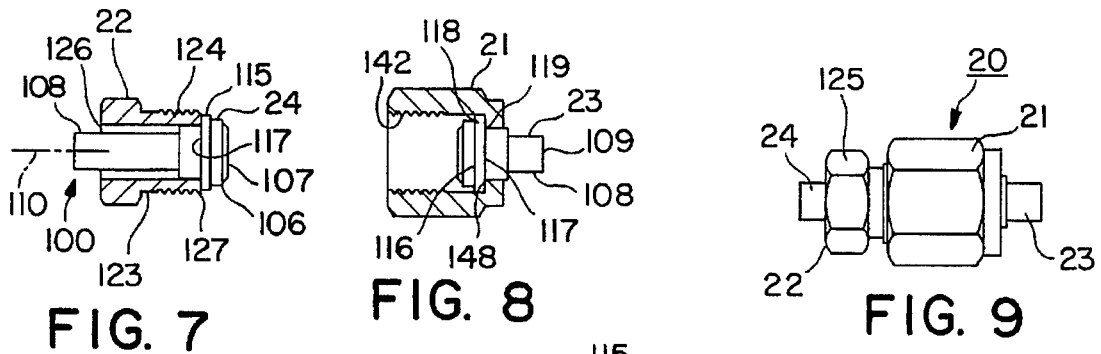
FIG. 7 shows a male nut holding a fitting to which it is captive after the welding is completed.
FIG. 8 shows a female nut holding, a fitting to which it is captive after the welding is completed.
FIG. 9 shows the nuts of FIGS. 7 and 8 tightened together to make a fluid seal between two of said fittings.
Figure 10:
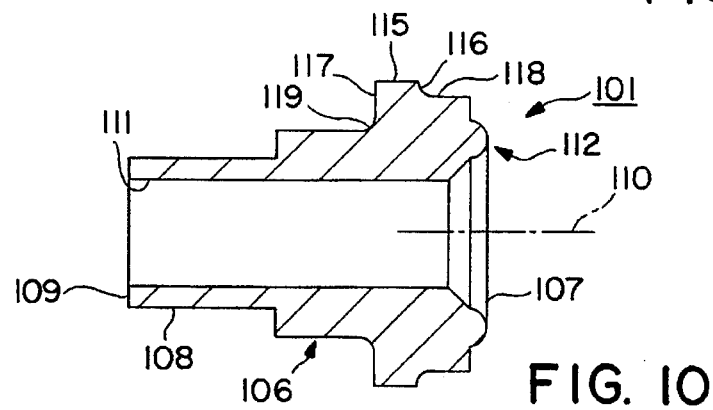
FIG. 10 is an enlarged axial cross-section of the head of the fitting.

The ultimate purpose of this invention is to provide a work-holder that will accurately hold and protect an end fitting while a length of tubing is welded to it, and also which will utilize the nut required for a compression coupling as part of the tooling for holding and aligning the fitting in process. For example, FIG. 9 is a side view of a coupling 20 comprising a female nut 21, a male nut 22. and fittings 23, 24, that are compressed together by the nuts, as will be more fully disclosed below. The ends of the fittings will have been welded to lengths of tubing 25 (FIG. 3), and the nuts will be captive on them after the welding is completed. This workholder, and the orbital welder which it receives, is quite portable, and is generally moved from weld location to weld location as the assembly of piping system progresses. Although if preferred, pre-cut tubing lengths can be brought to the workholder.

The workholder 30 will be recognized from the McGushion patent. It has a frame 31 with a base member 32. Wall members 33, 34 are attached to the base, and extend upwardly from it. The inner walls 35, 36 are slanted inwardly and downwardly so as to hold the orbital welder (not shown) described in the McGushion patent. This provides a wedge-like fit which accurately positions the welder, and which will define the location of central axes to be discussed.

Wall members 33 and 34 have respective outer walls 37, 38 and upper faces 39, 40. Recesses 41, 42 are respectively formed in upper faces 39, 40.

Clamp members 45, 46 are respectively hinged to wall members 33, 34. Compound hinges 47, 48 enable pivoting of the clamp numbers, and also some shifting. Inner wails 49, 50 are slanted, like walls 35 and 36. Lower faces 51, 52 will face upper faces 39, 40 when the clamps are closed. Outer walls 53, 54 are respectively formed on clamp members 45, 46.

Latch members 55, 56 are respectively provided on clamp members 45, 46. They are adapted to hook into the wall members to hold the clamps closed. They are a cam-type latch which permits some limited variation of respective positions of the clamp members and wall members when they are closed.

Recesses 60, 61 are formed in lower faces 51 and 52. When the clamp members are in the closed position, they will be opposite and aligned with recesses 41 and 42, as will be shown.

A split positioning sleeve 65 will be attached to the outer wall of one of the clamp members. For example, to outer wall 37 of wall member 33 and to outer wall 53 on clamp member 45. These outer walls are co-planar.

Sleeve 65 comprises two axially extending halves 66, 67. These halves are identical, so only half 66 will be described in detail. It includes a mounting face 68 to be fitted against outer wall 53. Face 68 is on a flange 69, and mounting holes 70, 71 through it receive bolts to hold the sleeve half to the clamp member. Similar provisions are made for sleeve half 67.

A curvilinear tongue 72 fits into a corresponding recess 73 in the clamp member to position the sleeve half. A cylindrically arcuate channel 75 extends away from mounting face 68. It has a linear central axis, and a defined radius.

Sleeve halves 66 and 67 are preferably formed from a single tubular piece which has been divided in two by removal of material which will leave an axial gap when the centers of curvature of the halves coincide. When they embrace a cylindrical body having the same radius, then edges 76, 77 will not touch one another, but the cylinder will be tightly embraced. If they embrace a cylinder with a smaller radius, it will be tightly held with its axis parallel to, and slightly to one side of the nominal axis of the positioning sleeve. If a bit oversize, it will still be tightly held, but with its axis slightly to the other side of the nominal axis of the positioning sleeve.

The other wall member will ordinarily be provided with means 79 to embrace and hold length 25 of tubing, comprising a pair of grip members 81, 82 fitted in the recesses 42 and 61, with arcuate portions 83, 84 to grip and align the tubing.

It will now be seen that the clamp members can be opened to allow insertion from the side of a length of tubing, and of a mount 100 which will now be described, and to hold them in proper alignment.

The function of mount 100 is accurately to hold a fitting 101. The mount has a central axis 102 and an outer cylindrical wall 103 which is to be embraced by the sleeve halves and to be held by them with axis 102 parallel to, and preferably coincident with their central axis.

The fitting 101 itself has a head 106 at one end 107, and a tubular length 108 terminating at its other end 109. The fitting has a central axis 110 which will be held accurately coincident with axis 102 of the mount. A central axial passage 111 extends from end to end of the fitting.

A peripheral seal 112 surrounds the passage at end 107. This seal must remain absolutely clean and smooth. It is essential that it be protected against being contacted by anything until it is abutted against a similar seal on a mating fitting.

A peripheral collar 115 extends around the head. It includes oppositely facing planar disc-like faces 116, 117. Of considerable importance to this invention are two tapered surfaces 118, 119 at the smallest diameter of the faces 116 and. 117. These need not be tapered in the sense of a frusto-conical surface. Usually it will be a small radius at the root of the disc-like face. This will provide a centering action, as will be disclosed below.

The provisions for welding a fitting to be used with a male nut will first be described. An internal bore 120 has an internal thread 121 to receive the threaded end of a male nut 22. Nut 22 has a neck 123 with an external thread 124 to engage thread 121. A hexagonal array of driving surfaces 125 is formed on the other end of the nut. The nut has an internal passage 126 and a bearing face 127 which is normal to the axis of the nut.

Reverting now to bore 120, there is a peripheral planar face 130 with a sharp edge 131, and a receptacle 132 with a depth sufficient to receive the sealing face without contacting it.

When the fitting is pressed toward planar face 130, the sharp edge bears against the tapered section of the head, and this will center the fitting. Further tightening brings the bearing face 127 of the nut against disc-like face 117 of the collar. Accordingly, the fitting is accurately held with its axis coincident with the axis of the mount.

The provisions for welding a fitting to be used with a female nut will next be described. It includes the same features as for the male nut, but in a different arrangement.

For this embodiment, the body of the mount includes a neck 140 with an external thread 141 to engage with the internal thread 142 of nut 21. A tubular extension 144 terminates in a bearing surface 145 with a sharp internal edge 146. A receptacle 147 is provided to receive the seals of the fitting as before. The nut includes a bearing surface 148 which is brought to bear against disc-like face 117 of the fitting. Edge 146 bears against tapered portion 119 to center the fitting.

In both embodiments, the mount will hold the fitting accurately, and then the mount is placed between the sleeve halves and advanced into the frame until the end of the fitting is accurately placed for welding. Then the clamp member is tightened down. Similarly, the adjoining length 25 of tubing is held by the other clamp means. The welder can then be inserted, and the weld made.

The assembled work is removed from the frame (or the frame is removed from the assembled work) merely by removing the welder and opening the clamps.

This invention is not to be limited by the embodiments shown in the drawings and described in the description, which are given by way of example and not of limitation, but only in accordance with the scope of the appended claims.

I claim:

1. In a workholder for holding a fitting in accurate alignment with a length of tubing in order to join the fitting to the length of tubing by an orbital welder, the workholder comprising a base, a pair of spaced apart side walls to receive said orbital welder, said side walls each mounting a clamp member for pivotal movement, and releasable latch means to hold the clamp member closed, the improvement comprising:

a split sleeve comprising two halves, one of said halves being attached to one of said clamp means, and the other attached to a respective sidewall, whereby said sleeves form channels with a central axis, opening into the spacing between the side walls when the clamp member is latched to its respective sidewall; and a mount comprising a body having a cylindrical outer wall of substantially the same radius as the radius of curvature of the said channels, whereby to be engaged and held by said clamp member to said side wall, said body having a central axis;

an axial bore in a first end of said mount, a peripheral bearing shoulder in said bore, a receptacle in said bore on the opposite side of said bearing shoulder from said first end, and a sharp edge on said shoulder at its intersection with said receptacle, whereby when a fitting having a head with an end seal and a peripheral collar is placed in said bore and a male nut is threaded into said bore, the male nut is threaded into said bore, the male nut presses against said collar, and the sharp edge bears against a tapered portion of said head to center said head, while the male nut clamps said collar against said shoulder to hold the fitting in the mount, and the mount can thereafter be clamped to the body.

2. In a workholder for holding a fitting in accurate alignment with a length of tubing in order to join the fitting to the length of tubing by an orbital welder, the workholder comprising a base, a pair of spaced apart side walls to receive said orbital welder, said side walls each mounting a clamp member for pivotal movement, and releasable latch means to hold the clamp member closed, the improvement comprising:

a split sleeve comprising two halves, one of said halves being attached to one of said clamp means, and the other attached to a respective sidewall, whereby said sleeves form channels with a central axis, opening into the spacing between the side walls when the clamp member is latched to its respective side wall; and a mount comprising a body having a cylindrical outer wall of substantially the same radius as the radius of curvature of the said channels, whereby to be engaged and held by said clamp member to said side wall, said body having a central axis;

a neck on a second end of said mount, a receptacle in said neck at said second end, a peripheral shoulder on the end of said neck, and a sharp edge on said shoulder at its intersection with said receptacle, and an external thread on said neck;

whereby when a fitting having a head with an end seal and a peripheral collar is placed against said second end, with the seal inside the receptacle, and a female nut is threaded onto said neck, said female nut presses against said collar, and said sharp edge bears against a tapered portion of said head to center said hear, while the female nut clamps said collar against said shoulder to hold the fitting in the mount, and the mount can thereafter be clamped to the body.

3. A workholder according to claim 2 in which said mount has its first end an axial bore in a first end of said mount, a peripheral bearing shoulder in said bore, a receptacle in said bore on the opposite side of said bearing shoulder from said first end, and a sharp edge on said shoulder at its intersection with said receptacle, whereby when a fitting having a head with an end seal and a peripheral collar is placed in said bore and a male nut is threaded into said bore, the male nut is threaded into said bore, the male nut presses against said collar, and the sharp edge bears against a tapered portion of said head to center said head, while the male nut clamps said collar apart said shoulder to hold the fitting in the mount, and the mount can thereafter be clamped to the body.

4. A mount for use with a workholder for holding a fitting in accurate alignment with a length of tubing in order to join the fitting to the length of tubing by an orbital welder, the workholder comprising a base, a pair of spaced apart side walls to receive said orbital welder, said side walls each mounting a clamp member for pivotal movement, and releasable latch means to hold the clamp member closed, a split sleeve comprising two halves, one of said halves being attached to one of said clamp means, and the other attached to a respective sidewall, whereby said sleeves form channels with a central axis, opening into the spacing between the side walls when the clamp member is latched to its respective sidewall, said mount comprising:

a body having a cylindrical outer wall of substantially the same radius as the radius of curvature of the said channels, whereby to be engaged and held by said clamp member to said side wall, said body having a central axis;

an axial bore in a first end of said mount, a peripheral bearing shoulder in said bore, a receptacle in said bore on the opposite side of said bearing shoulder from said first end, and a sharp edge on said shoulder at its intersection with said receptacle, whereby when a fitting having a head with an end seal and a peripheral collar is placed in said bore and a male nut is threaded into said bore, the male nut is threaded into said bore, the male nut presses against said collar, and the sharp edge bears against a tapered portion of said head to center said head, while the male nut clamps said collar against said shoulder to hold the fitting in the mount, and the mount can thereafter be clamped to the body.

5. A mount for use with a workholder for holding a fitting in accurate alignment with a length of tubing in order to join the fitting to the length of tubing by an orbital welder, the workholder comprising a base, a pair of spaced apart side walls to receive said orbital welder, said side walls each mounting a clamp member for pivotal movement, and releasable latch means to hold the clamp member closed, a split sleeve comprising two halves, one of said halves being attached to one of said clamp means, and the other attached to a respective sidewall, whereby said sleeves form channels with a central axis, opening into the spacing between the side walls when the clamp member is latched to its respective sidewall, said mount comprising:

a body having a cylindrical outer wall of substantially the same radius as the radius of curvature of the said channels, whereby to be engaged and held by said clamp member to said side wall, said body having a central axis;

an axial bore in a first end of said mount, a peripheral bearing shoulder in said bore, a receptacle in said bore on the opposite side of said bearing shoulder from said first end, and a sharp edge on said shoulder at its intersection with said receptacle, whereby when a fitting having a head with an end seal and a peripheral collar is placed in said bore and a male nut is threaded into said bore, the male nut is threaded into said bore, the male nut presses against said collar, and the sharp edge bears against a tapered portion of said head to center said head, while the male nut clamps said collar against said shoulder to hold the fitting in the mount, and the mount can thereafter be clamped to the body.

6. A mount according to claim 5 in which said body has at its first end an axial bore in a first end of said mount, a peripheral bearing shoulder in said bore, a receptacle in said bore on the opposite side of said bearing shoulder from said first end, and a sharp edge on said shoulder at its intersection with said receptacle, whereby when a fitting having a head with an end seal and a peripheral collar is placed in said bore and a male nut is threaded into said bore, the male nut is threaded into said bore, the male nut presses against said collar, and the sharp edge bears against a tapered portion of said head to center said head, while the male nut clamps said collar apart said shoulder to hold the fitting in the mount, and the mount can thereafter be clamped to the body.

* * * * *